United States Patent [19]

Turner

[11] Patent Number: 4,718,061
[45] Date of Patent: Jan. 5, 1988

[54] COMMUNICATIONS NETWORK HAVING BIT-MAPPED REFRESH CYCLE

[75] Inventor: Robert C. Turner, Ipswich, England

[73] Assignee: British Telecommunications public limited company, Great Britain

[21] Appl. No.: 882,715

[22] Filed: Jul. 7, 1986

[30] Foreign Application Priority Data

Jul. 18, 1985 [GB] United Kingdom ............... 8518133

[51] Int. Cl.$^4$ ........................... H04J 3/00; H04J 3/16
[52] U.S. Cl. ........................................ 370/89; 370/86
[58] Field of Search ................. 340/825.05, 825.5; 370/85, 89, 86, 90, 95, 96

[56] References Cited

U.S. PATENT DOCUMENTS

| | | | |
|---|---|---|---|
| 3,760,106 | 9/1973 | Monti | 370/89 |
| 4,154,983 | 5/1979 | Pederson | 370/94 |
| 4,251,880 | 2/1981 | Baugh et al. | 370/86 |
| 4,538,147 | 8/1985 | Grow | 370/89 |
| 4,549,291 | 10/1985 | Renoulin et al. | 370/89 |
| 4,569,041 | 2/1986 | Takeuchi et al. | 370/86 |
| 4,661,952 | 4/1987 | Von Sichert et al. | 370/89 |

FOREIGN PATENT DOCUMENTS 0079426  5/1983  European Pat. Off. .
0118767  9/1984  European Pat. Off. .
0125744 11/1984  European Pat. Off. .

Primary Examiner—Douglas W. Olms
Assistant Examiner—Melvin Marcelo
Attorney, Agent, or Firm—Nixon & Vanderhye

[57] ABSTRACT

A network for carrying real-time (RTS) and data services comprises stations (12) on a ring (11). Frames on the ring have a fixed boundary (15) between a real-time portion of the frame and a data portion. A sequence of cycles is initiated by a priority station. During a refresh cycle a bit map on the ring is marked by each station in turn to indicate which slots in the real-time portions are occupied. Next the stations bid for slots needed for new calls. During a third cycle information transfer for RTS calls takes place. After these cycles, priority is passed to the next station. The data portion may use a slotted ring or token ring data control protocol, and data transfer proceeds during RTS cycles. In an alternative version the boundary (15') may be relocated periodically depending on the level of real-time traffic.

14 Claims, 4 Drawing Figures

COMMUNICATIONS NETWORK HAVING BIT-MAPPED REFRESH CYCLE

The present invention relates to communication networks and in particular to communication networks of the type comprising a plurality of stations and a link for communicating between the stations wherein encoded informatin is carried in frames.

Communication networks for carrying data are known in various forms based on a ring, bus or star in which stations are connected to said rings, bus or star at nodes. However the recent trend has been towards providing an integrated service which is capable of carrying real-time information (speech and video etc) for which delays must not exceed a maximum limit once a call has been accepted.

An optical ring operating with a 125 micro second frame period is shown in European Patent Application No. 118 767. Each frame is divided into two sub frames allowing two different transmission protocols to operate simultaneously. Real-time calls are therefore carried in one portion of each frame and data packets are carried in another portion.

The data portin of a hybrid system may be used to carry signalling informatin for setting up a real-time call. Once a call has been set up then all the stations must be able to tell which time slots are in use and which time slots, if any, are available for seizure. European Patent Application No. 79426 discloses a local area network for carrying real-time calls in which each eight bit time slot of each frame has an associated bit within the frame which indicates whether the time slot is in use of available. These bits are collectively known as a bit map and may be carried within the frame as shown in No. 79426, or may be carried by a separate link between the stations. However, a problem with the bit map technique is that errors may corrupt the information carried by the bip map. These errors may exist for some time, thus reducing the efficiency of the system, or they may cause calls to be lost during transmission.

Noise on the link or a fault in a component may cause a bit to be set (indicating seizure of its associated time slot) when the time slot has not been seized and is free for use. This time slot is now excluded from use as there is no call to be cleared down and hence no means for resetting the associated bit. Similarly a bit may be reset in error while a call via the associated time slot is in progress. It is now possible for another station to seize this time slot which may result in two calls being lost.

According to the present invention there is provided a communication network comprising a plurality of stations and a link for communicatin between the stations in which encoded information is carried in frames; each of said frames having a real-time portion with time slots for real-time calls, and a data portion for signalling information: characterised in that a bit map is transferred between the stations indicating whether each real-time time slot is free or in use, and said frames are transmitted in cycles consisting of one or more frames, said cycles comprising a refresh cycle during which new seizures of real-time slots are prevented, said bit map is reset and stations transmitting real-time calls sequentially reclaim previously seized slots, and a bidding cycle in which stations are allowed to sequentially set up new real-time calls by seizing free time slots in said real time portion.

An advantage of the above invention is that an error in the bit map cannot propagate from station to station for long before a refresh cycle resets every bit and each station engaged in a call must again set the bit associated with the time slot it is using to make the call. The ideal time for a bidding cycle to occur is therefore immediately after a refresh cycle therefore giving minimum opportunity for errors to be generated.

In a preferred embodiment each station includes means for detecting a priority error which occurs when no station has priority status or when two or more stations have priority status, including means for resetting the system. The first station to detect a priority error may disable the other stations and then assume priority status after a predetermined delay period.

Preferably a bidding cycle is followed by one or more ordinary cycles during which calls are transmitted but slots are not seized. Calls may be halted during the refresh and bidding cycles but preferably calls continue to be made during all of the cycles ensuring maximum use of the available bandwidth. Preferably the number of ordinary cycles following a bidding cycle is randomly viable. This ensures that a priority error in which two stations assume priority will always be detected for any number of stations present in the network.

The invention will now be described, by way of example, with reference to the accompanying drawings, in which.

Figure 1:
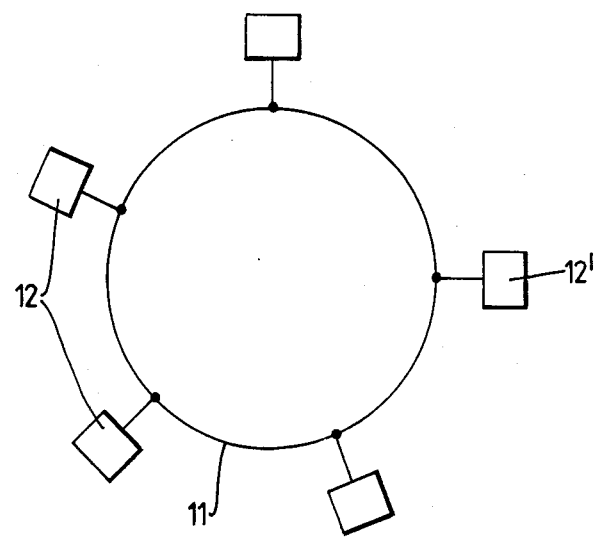
FIG. 1 is a schematic view of an example of a communications network according to the invention.

Referring to the drawings, FIG. 1 shows a ring 11 having several stations 12 at nodes on the ring, one of which, 12', acts as a monitor station using well-known protocols. One station is elected monitor on start up, but should this station fail, one of the other stations takes over the monitor function. The stations 12 may incorporate many forms of digital based devices such as data processing equipment, video devices, facsimile or telephone equipment, and access may be provided to the public switched telephone network. The monitor station 12' generates a fixed length frame every 125 microseconds (for public network compatibility) which circulates around the ring. Each frame comprises an integer number of bytes or slots. An elastic store in the monitor is used to ensure a total ring delay of an integer number of frames. In this example, the number of frames accommodated on the ring is 4.

Figure 2:
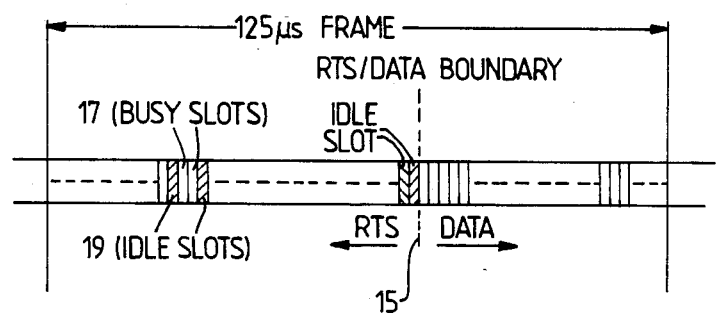
FIG. 2 is a diagram showing a frame on the network of FIG. 1 at a particular instant.

A typical frame is shown in FIG. 2. Each frame has a fixed boundary 15 which creates a division between real-time services, RTS, (eg speech and low bit rate video) and non-time sensitive data services. In the situation of FIG. 2, there are many busy eight bit slots 17 interspersed with empty slots 19 in the RTS portion of the frame. Generally, for the reasons explained below, there will be more empty slots at the end of the RTS portion of the frame than at the beginning. Slots for real-time services are seized according to the real-time needs of the stations on the ring and at busy times all slots in the RTS portion of the frame may be full. One of the stations is designated priority station and has the first opportunity to seize slots according to its needs. The opportunity to seize is passed round the ring; stations furthest from the priority station will stand a poorer chance of making desired seizures as all available slots may already have been seized. Priority status is acquired by each station in turn, as described below, so that no station is, on average, in a preferential position and each station has an equal opportunity to seize slots for real-time services over a period of time.

The two portions of each frame are essentially independent. The data part of each frame can operate according to standard protocols for data transmission: for example stations may be permitted to send one or more fixed or variable length packets, carrying source and destination address information and data. There are many known protocols enabling satisfactory transmission of data between stations on a ring or other link; bandwidth can be distributed amongst the stations as necessary and hogging of the data portion of the frame by particular stations avoided. Token passing or slotted ring protocols for example could be used, as desired. The RTS portions of the frames are effectively transparent to the protocols and a token, for example, may be spread across the data portions of two or more frames, being periodically interrupted or suspended by the RTS portion.

In the RTS portions of the frames, time division multiplexed (TDM) signals are transmitted between stations. There is no centralised controller, which simplifies the network structure, avoids problems associated with failure of a central controller and with concentrations of signalling traffic focussed on the central controller to establish slot seizure, and allows the network to be expanded relatively easily. If desired, there is freedom to designate a manager station to regulate access to the ring by very wide bandwidth users by means of higher level protocols, but still without the need for central control of slot seizure and assignment. In order to set up and clear down RTS calls, messages are sent using the data portions of the frames. These messages are sent only at set up and clear down, as once slot(s) have been designated for an RTS call between two stations, the same slot(s) in each frame are reserved for the duration of the call.

Figure 3:
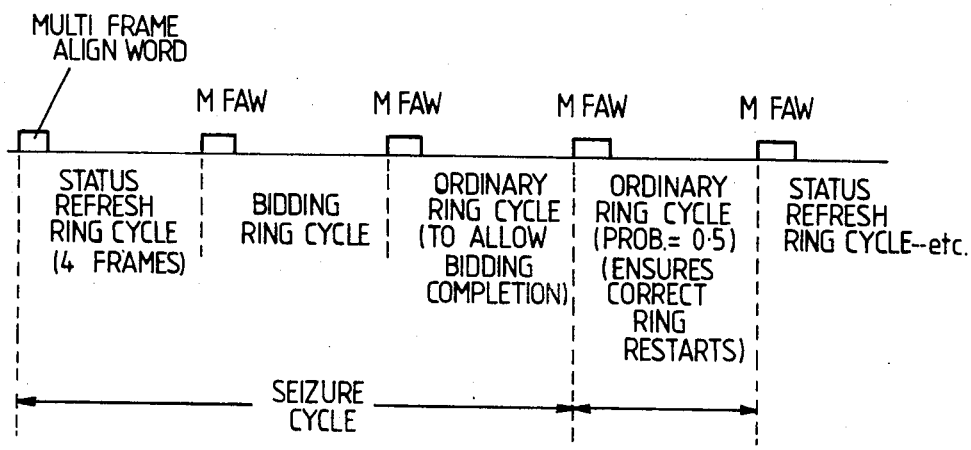
FIG. 3 is a diagram of a seizure cycle as seen at one node on the ring network of FIG. 1.

Accordingly, distributed control is provided for the real-time TDM part of the frame. A sequence of cycles occurs, as shown in FIG. 3, to allow stations to seize the number of slots necessary for their RTS calls in a fair manner. Other stations on the ring must be able to know which slots are already occupied. They also, in standard manner using high level protocols in the data portions of the frames, receive information on which slots contain bytes of information intended for them.

The period of each frame in this example is 125 microseconds; 4 frames are on the ring simultaneously and these constitute a multi-frame, or cycle. The period for a complete cycle is therfore 0.5 milliseconds and this is the propagation delay for the ring. A multi-frame alignment word is issued every 4 frames by the monitor station 12'. This is a readily identified field or flag of one or more bytes put into the first slot or slots of the first frame of each set of 4 frames in a multiframe. Each of the following three frames of the cycle commences with a starter flag, or frame alignment word, of similar form to the multi-frame work. The multi-frame and frame alignment words serve as alignment signals for timing purposes. The multi-frame alignment word may also be modified in certain circumstances as described below to indicate which of three possible types of cycle is to take place next.

A number of slots at the beginning of each frame are reserved for use as a bit map to indicate which RTS slots are empty and which are full. The bip map is divided between the 4 frames following each multi-frame word, so that a complete bit map is on the ring during every cycle. Thus several bytes at the beginning of each frame are devoted to the bit map which consists of a 2 bit indicator for each slot:

11=occupied
01=error
10=error
00=unoccupied

A station may only seize unoccupied slots and an error indicator is taken as an "occupied" indication. Thus a double error must occur before there can be false re-assignment of a slot. A station finding one of its seized slots already occupied on subsequent cycles would assume its seizure abandoned and re-establish another slot seizure. Each slot of 8 bits therefore carries an overhead of 2 bits used for the bit map per 4 frames, so the bit map incurs an overhead of 2 in every 34 bits.

The following sequence of cycles occurs: status refresh cycle; bidding cycle; ordinary (or transmission) cycle; a possible further ordinary cycle (probability 0.5); status refresh cycle etc. Each new cycle is initiated and controlled by the station currently acting as priority station, which modifies the multi-frame word to indicate which cycle is taking place. During all cycles, the data part of the frame is used for the transfer of data messages between stations independently of the RTS cycles.

During the status refresh cycle, each station marks up in the bit map the slots it already has control of (ie which it has seized during previous cycles and not yet released). This is necessary because the complete bit map is not stored in a central controller or in the individual stations; the bit map therefore needs to be regenerated on the ring on each new cycle. Complete regeneration has the advantage that errors in the bit map are not perpetuated. In addition to generating the bit map on the ring, each station fills the slots it has previously seized in each of the 4 frames which circulate during the status refresh cycle, thereby using these slots for carrying user real-time services.

The bidding ring cycle next occurs, during which slots are seized for the setting up of new calls. Calls are set up between a source station and a destination station on the ring using the data part of one or more frames to send signalling information including the identity of source and destination nodes and of the slots seized for the call. A single 64 kbit/sec voice call between two stations will need to send eight bits, ie one slot of informatin, every 125 microseconds. The voice call will therefore need a single slot. The first empty slot in the frame (according to the bit map) is seized by altering the bit map for the relevant slot. Throughout the duration of the call this same slot in all frames is used for the pcm TDM signals for that call. Therefore the initial exchange of information used in setting up the call and identifying slot(s) used is all that need be sent for the call in the data part of the frames until call clear-down.

Other stations may need to set up one or more calls, and will seize the appropriate number of slots. As the network becomes busier, there will be fewer and fewer empty slots to the left of the RTS/data boundary. When all slots up to the boundary are full, no further RTS slots can be seized until some of the slots currently occupied are released, and therefore no new calls can be set up. An overload affecting existing RTS calls is never allowed to occur as once the RTS portion of the ring is operating to capacity, no new calls are accepted. Of course, provision may be made for exceptional emergency calls to seize bandwidth from existing calls by a station making a slot seizure during the status refresh cycle, or bandwidth may be reserved for such calls.

Where the RTS portion of the frame is almost fully occupied a user such as a video user may not be able to seize enough bandwidth. In this case, the slots already seized are released on the next cycle. This prevents deadlock and system bandwidth inefficiency. During the bidding ring cycle, slots are seized and data messages continue to be sent in the data portions of the frames as described above.

The third cycle is an ordinary, or transmission, ring cycle, in which the bit map remains unaltered, thereby allowing the complete bit map (as updated during the bidding cycle) to pass all the ring nodes. Information is sent in all seized slots (including those seized during the bidding cycle) and the portions of the frames to the right of the boundary continue to be available for data.

Finally, there is a probability of 0.5 of a fourth cycle, which is again an ordinary cycle, occurring. This is necessary to put a stop to a continuous series of error cycles which could occur if 4 stations, or any number (3N+1) stations, simultaneously became designated priority stations. In this case each station could satisfy the expectations of the next and the error would not be detected. The introduction of a random element causes such an error situation to end very rapidly.

The priority station then passes the priority status to the next station by modifying the multi-frame word to indicate priority rotation. The next station to receive the multi-frame word converts the multi-frame word to initiate the next status refresh cycle. Rotation of priority status gives each station an equal opportunity to seize the bandwidth it needs over the full priority cycle time. For N stations each station acts as priority station once in 1.75 N msec on average. When traffic on the ring is heavy, a station spaced around the ring from the priority station may be unable to set up new calls, but it should be able to do so when it acquires priority status or when it is close to, but downstream of the priority station. Calls from stations downstream of a video station can therefore gain access to the ring within 1.75 N msec provided there is enough free capacity on the ring. Thus any station should be able to seize any RTS bandwidth in 3.5 N ring cycles except during very busy periods when little bandwidth is available for seizure.

Various error conditions may arise; as indicated above, more than one station may assume priority status, and there could be absence of a priority station. These conditions are dealt with as follows. Any station receiving an out of sequence multi-frame word modifies this to an "error" multi-frame word, and continues to enforce the "error" condition on subsequent multi-frame words for time t. All stations which receive the "error" multi-frame word reissue it for time t. Thus all stations receive the "error" multi-frame word, and this causes priority status to be relinquished. After time t, the "error" multi-frame word is converted to an "initialise" multi-frame word. When all stations have completed timeout t, one station, on receipt of the "initialise" multi-frame word, assumes priority status and normal ring operation is resumed. If two or more priority stations exist, at least some of them will send the next priority station on the ring unexpected multi-frame word modifier sequences and hence allow the cleardown sequence described above to start; the one exception to this is where there are 3N+1 stations each modifying the received multi-frame word to satisfy the expected sequence of the next. As explained above, this chain is broken by the random inclusion of a fourth cycle in the sequence. If there is no priority station, a sequence error will be detected on the ring (an unmodified or invalid multi-frame word will circulate) and the restart sequence will begin.

In the ring described above, the position of boundary 15 is fixed, so the respective bandwidths available to RTS and data services are constant. The boundary may conveniently be pre-set in each station before or at system start up.

Figure 4:
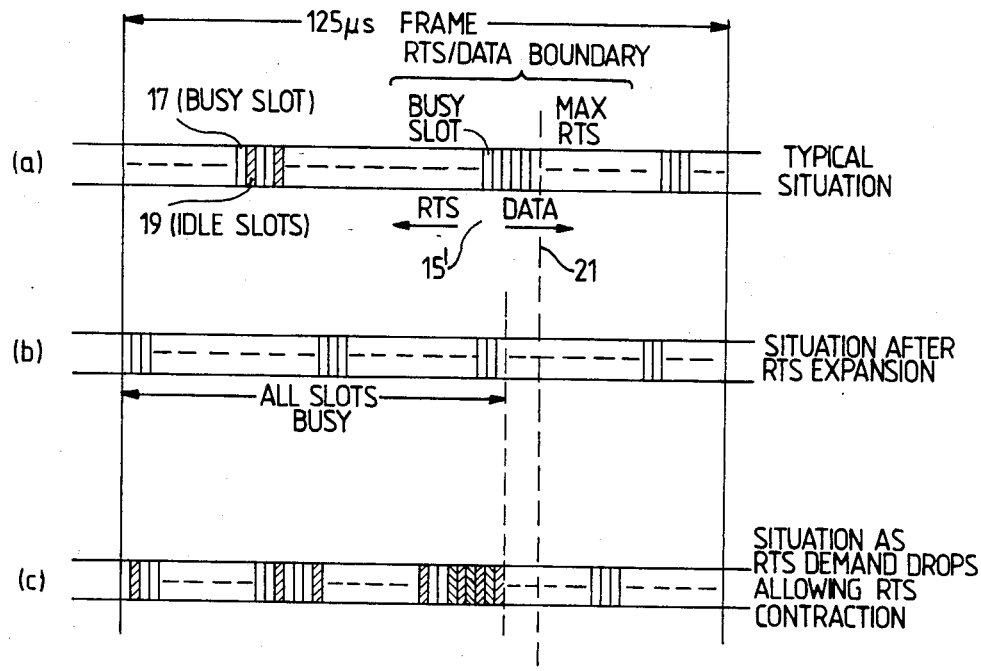
FIG. 4 is a diagram of a frame according to a second embodiment of the invention, at three different instants.

FIG. 4 shows a frame at three different instants for an alternative embodiment where the position of the frame boundary may be altered according to conditions on the ring. In this embodiment, the data part of the frame carries data packets or tokens of varying length according to standard token passing protocols. These protocols are essentially transparent to the RTS portion of the frame and a data packet may be spread across two or more frames. The frame of FIG. 4 has a boundary 15' which is movable. It has an extreme position 21, which is the maximum boundary position so as to reserve a portion of the frame for data, and for signalling messages for RTS services. Position 21 is pre-programmed data stored at monitor station 12' and all other stations 12 whilst the current position of boundary 15' is broadcast to all stations by means of a modification to each frame and multi-frame word initiated by the monitor station 12'.

FIG. 4(a) shows a typical situation, where some RTS slots 17 are busy and some are empty. Note that boundary 15' is next to a busy slot. If there are now some new call arrivals, slots are seized by the stations concerned (as described above for the fixed boundary example) starting with idle slots at the beginning of the frame. Gradually, all slots up to the existing boundary may be seized. If calls continue to arrive, then the boundary 15' may be moved towards its maximum position 21, as follows.

Approximately every second, the monitor station 12' performs an adaptation of frame boundary 15' on receipt of the data protocol token. On receipt of the t e n, the monitor station 12' suspends normal token protocol operation and transmits idle bit patterns in the data part of the frame. The generation o dle bit patterns continues until at least one multi-frame word indicating an ordinary cycle with the following multi-frame word indicating a refresh cycle are identified by the monitor station 12'. This ensures that there is no active data transmission on the ring and that the data portion of each frame is fully occupied by idle bit patterns.

On detection of the refresh cycle multi-frame word the monitor station updates the position of the frame boundary by modifying each frame and multi-frame word arriving at the monitor station. The modified word indicates the identity of the highest slot bid for during the last bidding cycle. Suppose on the previous adaptation, the boundary was located at (ie immediately after) slot n. Subsequently, suppose there to have been more call arrivals than clear downs and as a result, during most bidding cycles, stations have been bidding for slots beyond the nth slot. Until the next adaptation has taken place, bidding for slots beyond the nth slot is allowed, but such alots are not made available for RTS traffic and the bit map for those slots is not altered. Stations denied slots they have bid for must bid again on the next bidding cycle. On the next adaptation, the boundary position is updated according to the bidding during the latest cycle and the multi-frame and frame words are modified accordingly to broadcast this to all stations. The boundary is therefore relocated to the furthest slot seized during the last bidding cycle (see FIG. 4(b)), provided this is not beyond the maximum boundary position 21. If during the next interval between adaptations, there are more cleardowns than call arrivals, it may be possible to move the boundary 15′ to the left on the next adaptation. This will depend on whether the slot adjacent the boundary is released. In the situation shown in FIG. 4(c), there are six idle slots to the left of the boundary, which can therefore shift to the left by six slots. Because there is no contraction of the RTS portion of the frame until slots close to the boundary are cleared, the boundary tends to "peak detect" the maximum usage of RTS bandwidth, ie it moves rapidly to the right as traffic load increases and then retracts slowly. As a result, the relatively infrequent boundary adaptation (typically once a second) described above is adequate.

The identity of the new boundary is carried by the refresh multi-frame word which initiated the adaptation, and all subsequent frame and multi-frame words. All frames following the initiating refresh multi-frame word are employed for normal RTS and data transmission using the newly allocated frame portions. Thus when there are few RTS calls, most of each frame is available for data transmission and when the ring is busy with RTS calls, boundary 15′ may remain at the maximum boundary position 21 preserving a minimum bandwidth for data.

Boundary adaptation has been described above for a token passing data protocol; adaptation may also occur where there is a slotted ring data protocol. Adaptation occurs in a very similar manner, except that data transmission during adaptation is halted differently. The slotted ring data protocol has supervision facilities for each data packet to allow the monitor station to mark a packet as "unavailable" for one complete ring cycle, ie until data transmission has ceased. In the "unavailable" state, stations can receive data carried by such packets, but they cannot be used for transmission of data.

Following detection of an ordinary ring cycle multi-frame word, the monitor marks all packets unavailable. When the following refresh cycle multi-frame word is detected by the monitor, the position of the frame boundary is updated as described above. In addition, the monitor ensures that all the data slots in the data portions of the frames are correctly formatted for the slotted ring protocol (ie as empty) as each frame with a new boundary is issued, until normal data transfer operations resumed. Hence a single multi-frame is used to cleardown data transmission. Once the refresh multi-frame word is detected by the monitor station, packets are released by the monitor for data transmission in the new data portion of the frame after checking for correct format (ie header=empty).

The systems described are hybrid systems for real-time and data services. For real-time services, overassignment of slots to calls can never occur and overload strategies are therefore not required. There is distributed control amongst the stations on the ring, and no concentrations of signalling at a central controller station are required to establish slot seizure. No reliance need therefore be placed upon a central controller for the slot seizure function. Call set-up is also established node to node without a central controller by higher level protocols and bandwidth may be seized after only a relatively short delay. Each station is suitably dimensioned to cope with its own traffic and consequently the complete system can easily be expanded to accommodate additional stations. Priority for slot seizure is given to all stations in turn thus equalising slot seizure opportunities.

As explained above, the data portions of the frames may use token or slotted ring protocols. The protocol used does not affect the real-time part of the frame (although the stations will need to use the data protocol for setting up and clearing down RTS calls). The data parts of the frames are effectively transparent to the real-time parts and vice versa. For example, suppose 40% of a 100 Mbit/sec frame is used for speech and the remaining 60% for data. This is equivalent to around 38 Mbit/sec in continuous time for speech and 56 Mbit/sec for data, the remaining 6 Mbit/sec being devoted to the bit map, which is concentrated at the front of each frame following the frame or multi-frame alignment word.

If a slotted ring data protocol is used for a frame system with a movable boundary, then the frame boundary can be specified in single packet slot quanta equal to one data packet. On a 140 Mbit/sec ring, approximately 50 packet slots of 40 bytes per frame could be supported, and the boundary would move in 2% increments of capacity, which offers relatively fine manipulation of the boundary. In this case the RTS portion of a frame may have up to 39 empty single byte slots next to the boundary; the boundary will shift 40 slots to the left on release of the 40th slot. For low speed rings, on the other hand, a slotted ring protocol would allow only a much coarser manipulation of the boundary position, unless larger frame periods are used.

Under a token ring data protocol, data packets may extend across one or more frames, and token ring operation would therefore remain unaffected by boundary position (except of course insofar as the data rate available varies according to the portion of the frames available for data if the frame boundary is movable).

In the ring described above, the bit map for real-time services is concentrated at the front of each frame and shared across the four frames constituting a cycle. Alternatively, the bit map may be distributed across the whole of the multi-frame (including the data part of the frame) by adding, for example, a ninth bit before each alternate slot.

It will be noted that the system described effectively store the bit map on the ring and no storage of the complete bit map is required at the stations on the ring, although each station must record its own slot seizures. The bit map could, instead, be stored temporarily at the originating station (ie the current priority station). This bit map could then be distributed over a number of frames independent of the number of frames equal to the ring delay. The slot seizure process would then proceed as described above, except that the priority node would need to store at least that part of the bit map not accommodated by the frames stored by the ring delay, or possibly the complete returning bit map after each cycle before re-issuing it for the next cycle. Note that whilst a bit map of 2 bits per slot has been described, 1 bit per slot could be used although alternative means for error protection may be desirable. Smaller or larger multi-frames may be used, depending on delay requirements. Obviously multi-frames with large numbers of frames would have a reduced bit map overhead if the bit map is spread across the multi-frame as described in the above examples. Note also that the ring delay (0.5 msec in the examples, with four 125 microsecond frames) need not be the same as the period of the bit map.

Slot and frame sizes may not be the same for all slots and frames on the ring. Variable slot sizes are possible if the slot sizes are predefined in all stations. Under some circumstances it may be convenient for frames to comprise a non-integer number of slots, although integral numbers are generally easier to implement.

The above examples illustrate the invention as applied to a ring. Note that the system described is readily adapted for other forms of link. "Logical" rings including rings, buses and star networks where the bit map can be passed from station to station in a predefined manner may be used. For example, a token bus could be used to pass the bit map to control node access to a TDM system which is ring, star, or bus based.

What is claimed is:

1. A communications network comprising a plurality of stations and a link for communication between the stations in which encoded information is carried in frames; each of said frames having a real-time portion with time slots for real-time calls, and a data portion for signalling information: characterised in that a bit map is transferred between the stations indicating whether each real-time time slot is free or in use, and said frames are transmitted in cycles consisting of one or more frames; said cycles comprising a refresh cycle during which new seizures of real-time slots are prevented, said bit map is reset and stations transmitting real-time calls sequentially reclaim previously seized slots, and a bidding cycle in which stations are allowed to sequentially set up new real-time calls by seizing free time slots in said real time portion.

2. A communications network according to claim 1 wherein frames are generated by a priority station having priority status and frames are seized sequentially during refresh cycles and during bidding cycles starting from the priority station.

3. A communications network according to claim 2 wherein priority status is sequentially passed to all of the stations.

4. A communications network according to claim 3 wherein each station includes means for detecting a priority error which occurs when no station has priority status or when two or more stations have priority status, including means for resetting the system.

5. A communications network according to claim 4 wherein the first station which detects a priority error, disables the other stations and then assumes priority status after a predetermined delay period.

6. A communications network according to claim 1 in which a bidding cycle is followed by one or more ordinary cycles during which calls are transmitted but slots are not seized.

7. A communications network according to claim 6 in which the number of ordinary cycles following a bidding cycle is randomly variable.

8. A communications network according to claim 7 in which the number of ordinary cycles between a bidding cycle and the next refresh cycle is either one or two.

9. A communications network according to claim 8 in which frames are generated by a priority station, a priority station generates frames for a refresh cycle, a bidding cycle, one or two ordinary cycles and then passes priority status to the next station.

10. A communications network according to claim 1 in which a proportion of each frame is reserved for the bit map.

11. A communications network according to claim 10 in which the bit map is distributed over a plurality of frames.

12. A communications network according to claim 11, in which extra bits are provided in the bit map to facilitate a cyclic redundancy check.

13. A communications network according to claim 1 in which the data portion also carries user related data in addition to the signalling information.

14. A communications network according to claim 13, in which a boundary between the real-time portion and the data portion may be adjusted to accommodate changes in relative traffic densities.

* * * * *